United States Patent
Wible et al.

[11] 3,757,215
[45] Sept. 4, 1973

[54] UNICOIL ELECTRICAL INDICATOR INSTRUMENT

[75] Inventors: Joseph B. Wible, Lancaster; Paul E. Martin, Ephrata, both of Pa.

[73] Assignee: Datcon Instrument Company, East Petersburg, Pa.

[22] Filed: Apr. 6, 1972

[21] Appl. No.: 241,674

[52] U.S. Cl. .............................................. 324/146
[51] Int. Cl. ............................................ G01r 1/20
[58] Field of Search .................... 324/146, 147, 151, 324/154, 140, 131, 132; 335/229

[56] References Cited
UNITED STATES PATENTS

| | | | |
|---|---|---|---|
| 1,393,737 | 10/1921 | Ballman | 324/146 |
| 1,580,768 | 4/1926 | Todd | 324/146 |
| 2,178,108 | 10/1939 | Schwarze | 324/140 R |

*Primary Examiner*—Alfred E. Smith
*Attorney*—John C. Holman, Dennis O. Kraft et al.

[57] ABSTRACT

A novel electrical instrument or gauge is disclosed for indicating current flow as produced by an external sending unit, for example. The indicator instrument comprises a rotor assembly which includes a pointer and a permanent magnet armature attached thereto, the rotor assembly being disposed for rotation in a plane about a rotational axis. Importantly, a single electromagnetic coil is disposed substantially in said plane and aligned with respect to said rotor assembly such that the center line of said coil intersects with said rotational axis. A magnetized core piece is also disposed substantially in said plane and is aligned with respect to the rotor assembly and the electromagnetic coil such that the center line of the magnetized core piece intersects with the rotational axis of the rotor assembly and lies at an angle of substantially 90° to the center line of said electromagnetic coil. In the preferred inventive embodiment, a further magnetized core piece is disposed within the electromagnetic coil provided, coaxial with the center line thereof. The single or unicoil design of the instant invention is such that the novel assembly exhibits a simplified construction and increased reliability. The operation of the novel instrument of the instant invention is typical in that the pointer will move in accordance with current flow through the electromagnetic coil, which current is itself in accordance with a variable to be indicated.

6 Claims, 2 Drawing Figures

PATENTED SEP 4 1973 3,757,215

UNICOIL ELECTRICAL INDICATOR INSTRUMENT

BACKGROUND OF THE INVENTION

This invention generally relates to electrical instruments and particularly concerns a novel electrical indicator instrument of the type particularly adapted to measure and indicate current flow.

Electrical indicator instruments of the current measuring or "ammeter" type under consideration herein are utilized in various environments to measure current flow through some external circuit. For example, such electrical indicator instruments can be coupled in circuit with a remote sending or transmitting unit, such as a temperature sending device, a liquid level sensing device, or the like, which sending units normally alter their resistance in accordance with some variable to be indicated. The sender unit itself is usually disposed in electrical circuit with a source of current, such as a battery. Accordingly, the typical electrical indicator instrument thereby is energized with current in accordance with a variable to be indicated, the instrument either "reading" the average value of the current flow therethrough, or the instantaneous value thereof.

A particular environment of utility for such electrical indicator instruments are as panel-type instruments or gauges for use in motor vehicles. In this respect, such instruments would serve to indicate the value of a variable such as engine temperature, fuel level, charging rate, or the like, in accordance with current flow through a respective associated sending unit. Such instruments or gauges that are to be utilized in motor vehicles are subject to more stringent constructional requirements. For example, panel-type instruments may be fabricated of sturdy materials, must be economical to manufacture, and must be reliable in operation due to their oftentimes inaccessible mounting locations. Conventional panel-type indicating instruments rarely meet or possess these requisite attributes. For example, the typical panel-type instrument normally possesses a plurality of electromagnetic coils and a resultant complex internal magnetic circuit which oftentimes leads to an increased failure rate and lack of reliability. Additionally, typical panel-type instruments normally are provided with a casing which itself must be connected to some vehicle ground, this connection being in addition to separate electrical connections that must be made to the various internal electromagnetic coils. Again, complexity in installation, construction, and operation are evident.

BRIEF SUMMARY OF THE INVENTION

It should therefore be apparent, that a need exists in the electrical indicator instrument art for an improved instrument of novel constructional design by which the disadvantages of prior art designs as above-discussed are eliminated. It is the primary objective of the instant invention to provide such an improved electrical indicator instrument.

A further, more specific, yet equally important objective of the instant invention concerns the provision of an electrical indicator instrument which can be inexpensively manufactured and which can be easily assembled and constructed.

Another objective of the instant invention concerns the provision of an electrical indicator instrument, particularly adapted for panel mounting in a vehicle, for example, which does not require any ground connection, but merely requires two external connections to a circuit.

Yet another objective of the instant invention concerns the provision of an electrical indicator instrument of the type described which evidences an increased reliability over prior art designs.

A still further objective of the instant invention concerns the provision of an electrical indicator instrument which provides a stablized gauge read-out, irrespective of normal voltage fluctuations as would occur in a modern motor vehicle electrical system.

Yet another objective of the instant invention concerns the provision of an electrical indicator instrument which provides a so-called "return-to-zero" feature whereby the indicator thereof will align itself to some quiescent or "zero" point upon deenergization of the instrument.

These objectives as well as others which will become apparent as the description proceeds are implemented by the instant invention which, as above-discussed, comprises an electrical indicator instrument for measuring current flow therethrough, the instrument in the preferred inventive embodiment measuring the "average value" of such current flow. The current flow itself is such as would be obtained from a remote sending unit disposed in circuit with a vehicle battery, for example, the instrument adapted to be energized with current in accordance with a variable to be indicated.

The electrical indicator instrument of the instant invention can be thought to consist of three basic components or systems comprising: an external electrical circuit; an internal magnetic circuit; and a magnet-pointer assembly which serves to generate the "read-out" or indication of current flow through the external circuit.

As above-discussed, the external circuit in which the instant inventive instrument is contemplated to be utilized comprises a circuit including the battery of a motor vehicle, for example, and a remote sending unit adapted to vary its resistance, for example, in accordance with some variable to be indicated. The battery and the sending unit are contemplated to be connected in series circuit with the electrical indicator instrument, the instrument itself having only two external connections. In this fashion, ground connections typical of electrical indicator instruments of the prior art are eliminated which eliminates the need for providing metal panels, metal clamps or special wiring and thus reduces the cost of the novel device.

The magnet-pointer assembly of the novel electrical indicator instrument comprises a rotor assembly which will be seen to include a pointer and a permanent magnet armature attached thereto. The rotor assembly is disposed for rotation in a plane about a rotational axis. Again, even the construction of the rotor assembly of the instant invention exhibits a marked simplification over prior art types in that, as will be seen, the rotor assembly is contemplated to comprise a one-piece injection molded plastic pointer assembly.

The internal magnetic circuit of the indicator instrument is likewise simple in construction. Lying at the heart of the invention is the utilization of but a single electromagnetic coil which is disposed substantially in the plane of rotation of the rotor assembly and is aligned with respect to the rotor assembly such that the center line of the single electromagnetic coil intersects with the rotational axis of the rotor assembly. Rather than utilizing additional electromagnetic coils as do typical prior art constructions, the instant invention contemplates the utilization instead of a first magnetized core piece which is disposed substantially in the same plane of rotation of the rotor assembly and is aligned with respect to the rotor assembly and the single electromagnetic coil such that the center line of the core piece intersects with the rotational axis of the rotor assembly and lies at an angle of substantially 90° to the center line of the electromagnetic coil.

The magnetic circuit of the electrical indicator instrument of the instant invention is completed by the provision of a second magnetized core piece which is contemplated to be actually disposed within the electromagnetic coil coaxial with the center line thereof. This second core piece provides the above-mentioned "return-to-zero" feature in that the magnetic field produced therefrom serves to bias the rotor assembly to a predetermined position upon deenergization of the single electromagnetic coil. Of course, and so as to refine or shape the magnetic field produced in the instrument, soft iron core pieces are disposed adjacent each of the magnetized core pieces which greatly facilitates operation of the device.

In operation, it can initially be presumed that no current flows through the single electromagnetic coil of the instrument. In this condition, the magnetized core piece which is disposed within the electromagnetic coil creates a magnetic field which attracts the permanent magnet armature of the rotor assembly such that the rotor assembly is biased to some predetermined position, such as "zero." As current flows through the single electromagnetic coil, the magnetic field produced thereby operates upon the permanent magnet armature, in association with the permanent magnetic field operating upon the armature magnet produced by the first magnetized core piece disposed at an angle of 90° with respect to the electromagnetic coil. As such, the permanent magnet rotor will tend to align itself in accordance with the resultant or combined magnetic field vectors produced, on the one hand, by the electromagnetic coil, and, on the other hand, by the first permanent magnet core piece. The position assumed by the armature magnet will be indicated by the pointer attached thereto and thus, the average value of current flow through the single electromagnetic coil would be "read-out" and indicated.

BRIEF DESCRIPTION OF THE DRAWINGS

The invention itself will be better understood and further features and advantages thereof will become apparent from the following detailed description of a preferred inventive embodiment, such description making reference to the appended sheet of drawings, wherein.

DETAILED DESCRIPTION OF A PREFERRED INVENTIVE EMBODIMENT

Figure 1:
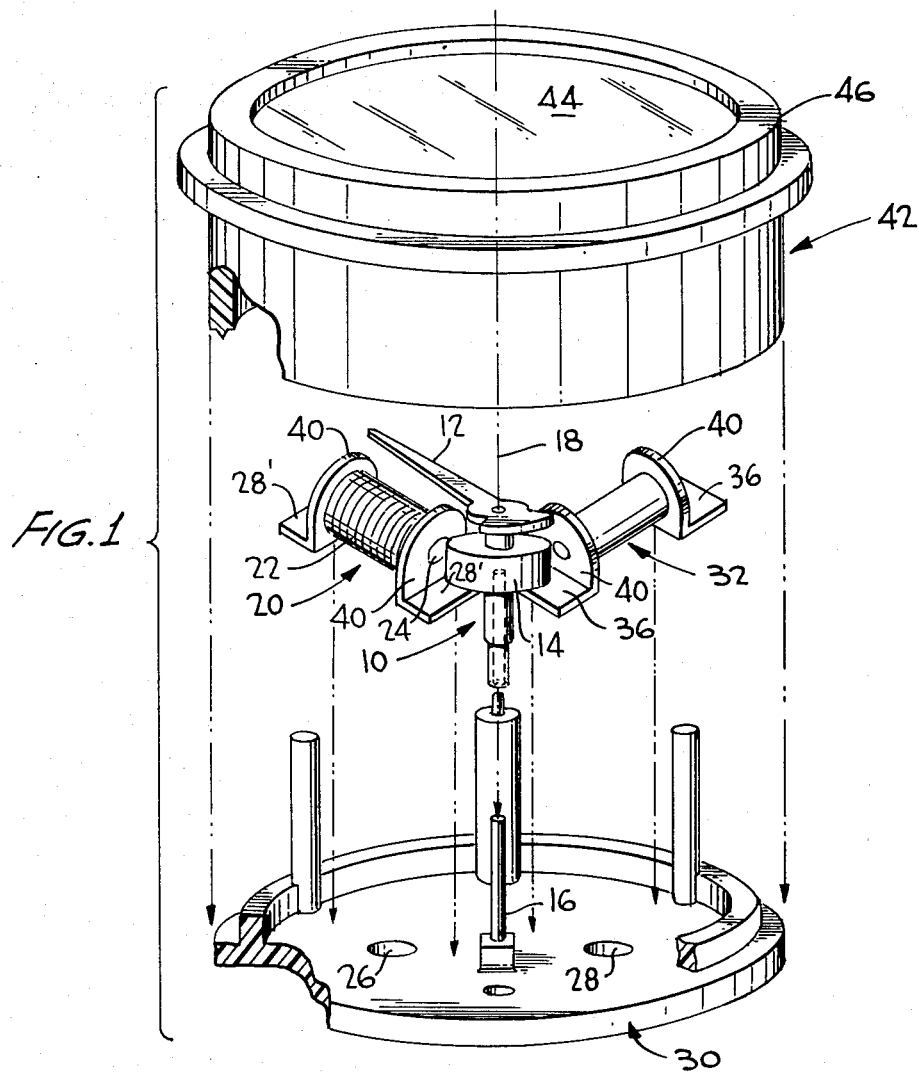
FIG. 1 is an exploded perspective view of the electrical indicator instrument of the instant invention, the constructional details thereof being simplified so as to facilitate an understanding of the novel concepts therein disclosed.

Referring now to the drawings and particularly to FIG. 1 thereof, an exploded, though simplified, illustration of the novel electrical indicator instrument of the invention can be seen. The instrument comprises a rotor assembly generally designated by reference numeral 10 which includes a one piece injection molded plastic pointer 12 and a disc-like permanent magnet armature 14 attached thereto. Permanent magnet 14 is magnetized across the diameter thereof, so as to present opposite magnetic poles on opposite sides. The rotor assembly is pivotally mounted about a spindle 16 for rotation in a plane about rotational axis 18.

The novel electrical by instrument further includes a single electromagnetic coil generally designated by reference numeral 20. In the preferred inventive embodiment, the electromagnetic coil 20 comprises a plurality of windings 22 about an internal iron core 24. The windings 22 are disposed in the same direction and the end connections thereof are respectively coupled to lugs 26 and 28 which extend through a disc-like backing plate generally designated by reference numeral 30 as will be discussed in more detail hereinbelow.

The positioning of the electromagnetic coil 20 is such that coil 20 is disposed substantially in the same plane of rotation of the rotor assembly 10 and is aligned with respect to the rotor assembly such that the center line 26' of the electromagnetic coil 20 (see FIG. 2) intersects with the rotational axis 18 of the rotor assembly 10. In the preferred inventive embodiment, as shown, the electromagnetic coil 20 is maintained in the above-described position by means of a bobbin 40, or the like, disposed on the backing plate 30.

A first magnetized core piece generally designated by reference numeral 32 is also disposed substantially in the plane of rotation of the rotor assembly 10 and is aligned with respect to the rotor assembly 10 and the single electromagnetic coil 20 such that the center line 34 of the magnetized core piece 32 (see FIG. 2) intersects with the rotational axis 18 of the rotor assembly 10 and lies at an angle of substantially 90° to the center line 26 of the electromagnetic coil 20. The magnetized core piece 32 is maintained in position in substantially the same manner as described with respect to the electromagnetic coil 20 in that a bobbin or other suitable mounting 36 is provided on the backing plate 30.

Figure 2:
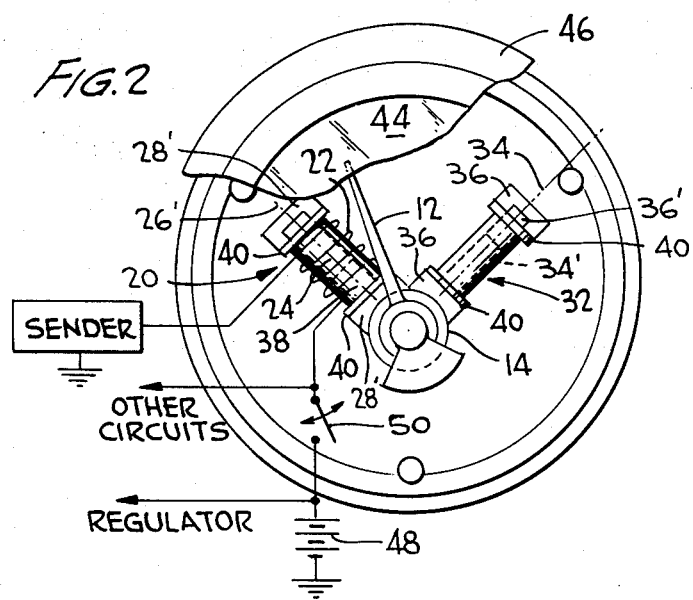
FIG. 2 is a schematic plan view of a typical external circuit and the magnetic circuit associated with the electrical indicator instrument of the invention.

Referring, now, specifically to FIG. 2 of the drawings, the detailed configuration of the electromagnetic coil 20 and the first magnetized core piece 32 can be seen. Specifically, it should be noted that magnetized core piece 32 is, in fact, constructed of an internal iron core 34' which lies in contact with a cylindrical permanent magnet 36, permanent magnet 36 being magnetized along the center line 34 thereof.

Similarly, the electromagnetic coil 20 incorporates an iron core 24, as above-discussed, as well as a second magnetized core piece 38 which is actually disposed within the coil 20 coaxial with the center line 26' thereof. In a fashion to be explained hereinbelow, this second magnetized core piece 38 serves to bias the permanent magnet armature 14 of the rotor assembly 10 to a predetermined position, such as a "zero" position upon deenergization of the electromagnetic coil 20.

In the preferred inventive embodiment, soft iron core pieces 34', 24 are disposed adjacent, or in magnet circuit, with each of the magnetized core pieces 36 and 38. These soft iron core pieces 34', 24 serve to shape the generated magnetic field. As another fine point of construction, the preferred inventive embodiment is such that the positions of a magnetized core piece 38 and the core piece 24 disposed in the coil 20 are adjustable, i.e., adjustably disposed to be moved in the direction of their respective center lines. This particular feature of the instant providd insures that the novel instrument can be calibrated and electrically matched to an external sender.

The novel instrument assembly further includes a housing therefor preferably constructed of plastic. As shown in FIG. 1, the housing is of two-part construction and includes a hollow annular casing generally designated by reference numeral 42 which is open at both ends thereof. A transparent window 44 which may, for example, contain indicia thereon, is disposed over one of the ends of the housing. The manner in which the bezel 46 is attached to the annular casing 42 in itself represents a simplification of prior art construction. Specifically, and in the preferred inventive embodiment, a mold is provided and the bezel 46 is disposed in the mold. The annular casing 42 is then injection molded by forcing plastic into the mold thus bonding the metal bezel with the casing 42. Of course, and if desired, other techniques could be utilized for bonding the bezel 46 to the casing 42 and, in fact, the bezel 46 could itself be constructed of plastic.

The housing further includes a disc-like backing plate 30 as above-discussed. The backing plate 30 has been seen to carry the rotor assembly 10, the electromagnetic coil 20 and the various core pieces 32 and 24 mounted thereon. Since all the internal parts of the electrical indicating instrument are disposed on the backing plate or disc 30, assembly and/or repair of the apparatus is facilitated. The backing plate 30 is itself attached to the other open end of the annular casing 42, preferably by a technique such as ultrasonic welding.

Referring again to FIG. 2 of the appended drawings, a typical external circuit into which the novel instrument is placed is disclosed. As mentioned at the outset, the electrical indicating instrument is particularly adapted for use as a panel-type gauge or meter in a motor vehicle, for example. Accordingly, the external circuitry will be seen to include a DC battery 48, one terminal of which is connected to ground, as shown. The other terminal of battery 48 is coupled through an ignition switch 50, for example, to one end of the winding 22 of the electromagnetic coil 20. The other end of the winding 22 of coil 20 is connected in series circuit to a remote sender unit 52, which sender unit could comprise a temperature sending device or the like, sender unit 52 likewise being connected to ground to complete the series circuit. As also shown in FIG. 2, the remaining circuitry normally associated with a motor vehicle, for example, is connected to the series circuit above-described to either end of the ignition switch 50. Thus, a regulator circuit might be connected to the positive terminal of battery 48, whereas other accessory circuits and the like could be connected on the gauge side of the ignition switch 50.

Operation of the electrical indicator instrument is as follows. When the coil 20 is deenergized, the permanent magnet core piece 38 thereof provides a magnetic field which serves to attract the permanent magnet armature 14 of the rotor assembly 10 so that the pointer 12 of the rotor assembly assumes a predetermined, or zero position. This is a so-called "return-to-zero" operational feature. Oftentimes, users of the instrument or gauge are desirous of having the pointer return to a zero or safety position when power is removed so that, upon reenergization of the instrument, the pointer motion can be observed so as to indicate a proper connection or lack of fault in the external electrical circuit.

When current is flowing in the external circuit from battery 48, the resistance of the remote sender unit 52 determines the magnitude of such current. Since the windings 22 of coil 20 are disposed in series circuit with this current path, a magnetic field will be produced by the electromagnetic coil 20. This magnetic field will interact with the magnetic field effected by the magnetized core piece 32 so that a resultant magnetic field vector will appear. Since the permanent magnet armature 14 of the rotor assembly 10 is magnetized across its diameter, this armature will track the resultant magnetic field vector and specifically, will attempt to align its poles in the direction of the magnetic field vector at all times. In this manner, the permanent magnet armature 14 will cause the pointer 12 to which it is attached to indicate the magnitude of the current flow through the circuit, or the magnitude of the remote sender 52 resistance change by means of changes in the direction of the resultant magnetic field vector.

In addition, the novel electrical indicator instrument design of the instant invention provides a freedom from the influence of normal input voltage variations such as would occur in a vehicle electrical system. Specifically, since these normal input voltage variations are small due to the characteristics of above described. ignition system design, the utilization of the single electromagnetic coil provides sufficient enough regulatory characteristics, without the necessity of a dual coil design so typical in the prior art.

Calibration of the electrical indicator instrument of the instant invention can readily be effected simply by adjusting the characteristics of the magnetized core pieces and, specifically, by moving the magnetized core pieces 32 and 38 in a direction along their various center lines thereof as above described. Final calibration, during production, could thereby be provided by replacing the remote sender 52, for example, with known resistor values. Additionally, and if desired, the instrument can include an internally mounted fixed carbon resistor, or the electromagnetic coil 20 could be wound with specific sizes of resistance wire, so as to achieve a matched condition for optimum instrument sensitivity, thus matching various families of remote senders 52 with a particular instrument.

It should now be apparent from the foregoing detailed description that the objects set forth at the outset to this specification have been successfully achieved. Moreover, while there is shown and described a preferred embodiment of the invention, those skilled in the art should distinctly understand that the invention is not limited specifically thereto but may be otherwise variously embodied and practised within the scope of the following claims. Accordingly,

What is claimed is:

1. An electrical indicator instrument comprising in combination:

a rotor assembly including a pointer and a permanent magnet armature attached thereto, said rotor assembly being disposed for rotation in a plane about a rotational axis;

a single electromagnetic coil disposed substantially in said plane and aligned with respect to said rotor assembly such that the center line of said coil intersects with said rotational axis;

a first magnetized core piece disposed substantially in said plane and aligned with respect to said rotor assembly and said electromagnetic coil such that the center line of said first core piece intersects with said rotational axis and lies at an angle of substantially 90° to said center line of said electromagnetic coil;

a second magnetized core piece disposed within said electromagnetic coil coaxial with the center line thereof, said core piece biasing said rotor assembly to a predetermined position upon deenergization of said electromagnetic coil; and electrical connections to said electromagnetic coil by which said coil is adapted to be energized with current in accordance with a variable to be indicated.

2. An instrument as defined in claim 1, wherein said core pieces are adjustably disposed to be moved in the direction of their respective center lines, whereby the instrument can be calibrated and electrically matched to an external sender.

3. An instrument as defined in claim 2, further including soft iron pole pieces disposed adjacent said magnetized core pieces to shape the magnetic field.

4. An instrument as defined in claim 3, wherein each magnetized core piece is a permanent magnet cylindrical core magnetized along the center line thereof, and wherein said permanent magnet armature is of disc-like construction and is magnetized across the diameter thereof.

5. An instrument as defined in claim 1, further including a housing therefor, said housing being constructed of plastic and including a hollow annular casing open at both ends thereof, a transparent window disposed over one of the ends of the casing, and a disc-like backing plate upon which said rotor assembly, said coil, and said core pieces are mounted, said backing plate being disposed over the other end of said casing.

6. An instrument as defined in claim 1, further including an external circuit therefor, said circuit comprising a battery and a sender unit adapted to vary its resistance in accordance with a variable to be indicated, and means connecting said battery, said sender unit and said electromagnetic coil in series circuit.

* * * * *